US012287890B2

(12) United States Patent
Gulati et al.

(10) Patent No.: US 12,287,890 B2
(45) Date of Patent: Apr. 29, 2025

(54) COMPUTER-BASED SYSTEMS CONFIGURED FOR EFFICIENT AND SECURE MULTI-USER ELECTRONIC ACTIVITIES AND METHODS OF USE THEREOF

(71) Applicant: Capital One Services, LLC, McLean, VA (US)

(72) Inventors: Latika Gulati, Vienna, VA (US); Michael Wolf, Ellicott City, MD (US); Lin Ni Lisa Cheng, Great Neck, NY (US)

(73) Assignee: Capital One Services, LLC, McLean, VA (US)

( * ) Notice: Subject to any disclaimer, the term of this patent is extended or adjusted under 35 U.S.C. 154(b) by 237 days.

(21) Appl. No.: 17/942,705

(22) Filed: Sep. 12, 2022

(65) Prior Publication Data

US 2024/0086555 A1 Mar. 14, 2024

(51) Int. Cl.
*G06F 21/60* (2013.01)
*G06F 21/31* (2013.01)

(52) U.S. Cl.
CPC .......... *G06F 21/606* (2013.01); *G06F 21/31* (2013.01)

(58) Field of Classification Search
None
See application file for complete search history.

(56) References Cited

U.S. PATENT DOCUMENTS

| 10,185,959 | B2 | 1/2019 | Atagun et al. | |
|---|---|---|---|---|
| 10,614,440 | B2 | 4/2020 | Benkreira et al. | |
| 2018/0174153 | A1* | 6/2018 | Atagun | G06Q 20/40145 |
| 2019/0268321 | A1* | 8/2019 | Kim | G06F 21/45 |

FOREIGN PATENT DOCUMENTS

WO 2020/036588 A1 2/2020

* cited by examiner

*Primary Examiner* — Scott B Christensen
(74) *Attorney, Agent, or Firm* — Greenberg Traurig, LLP

(57) ABSTRACT

Systems and methods of the present disclosure enable split communication routing. A communication request associated with an electronic activity is received, the communication request specifying a virtual token and a data content, where the virtual token is a proxy for multiple actual data source profiles. A split rule defining a proportion of the data content to be attributed to each actual data source profile is determined. A security score is determined based on each actual data source profile and each proportion of the data content. The communication request is authorized based on the security score exceeding a threshold security score and access to the proportion of the data content in each actual data source profile is enabled. Each proportion of the data content is consolidated into a single response, and the electronic activity is executed with the single response.

20 Claims, 8 Drawing Sheets

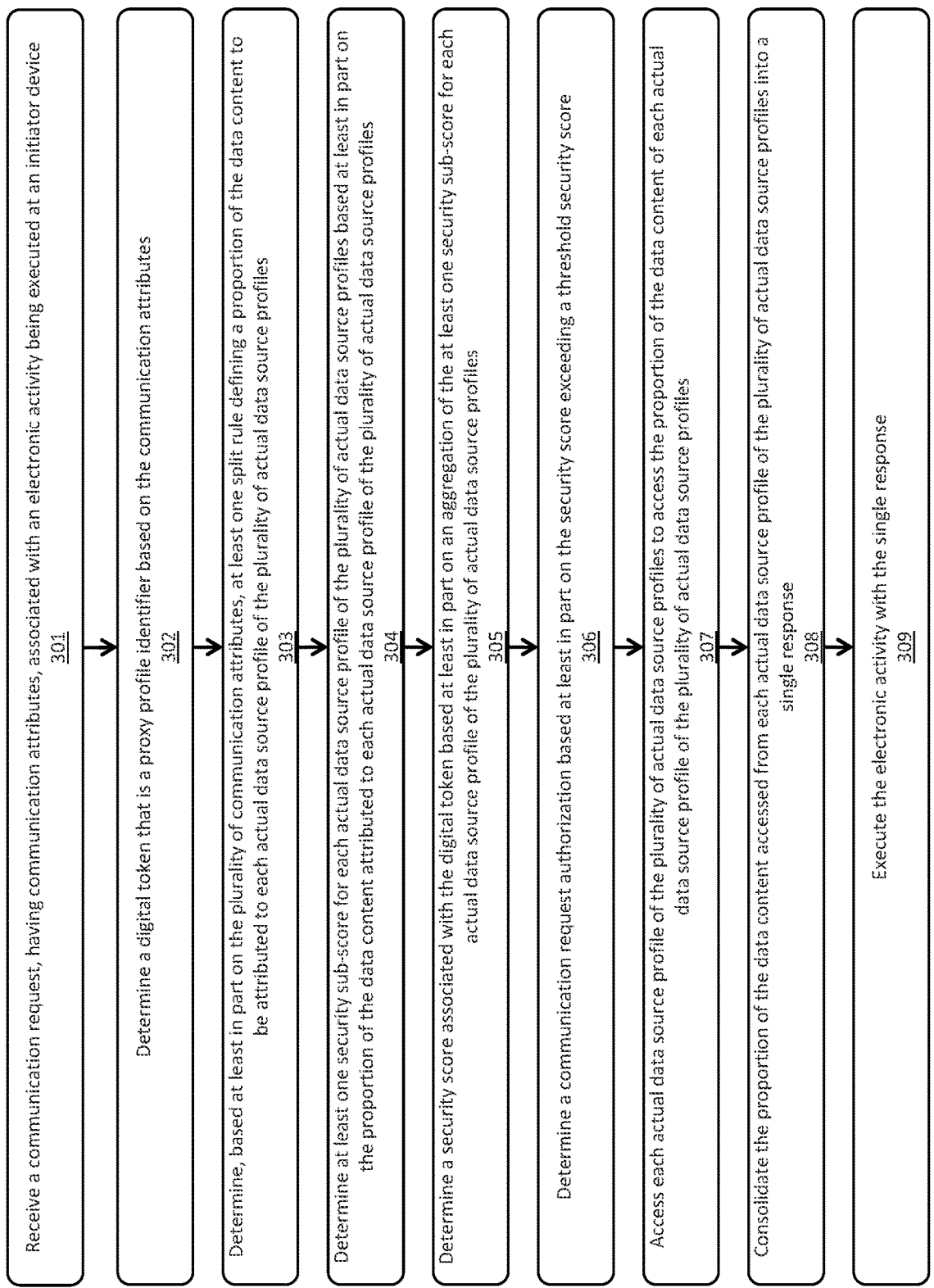

COMPUTER-BASED SYSTEMS CONFIGURED FOR EFFICIENT AND SECURE MULTI-USER ELECTRONIC ACTIVITIES AND METHODS OF USE THEREOF

TECHNICAL FIELD

The present disclosure generally relates to computer-based systems and methods for efficient and secure multi-user electronic activities, including splitting data and/or processes across multiple user profiles to cooperatively perform an electronic activity.

BACKGROUND

Typically, users that engage in electronic activities in a cooperative fashion divide portions and/or data of the electronic activities manually or set up a separate user profile that each user is associated with so that the electronic activities can be performed relative to the separate user profile

SUMMARY

In some aspects, the techniques described herein relate to a method including: receiving, by at least one processor, a communication request associated with an electronic activity being executed at an initiator device; wherein the communication request includes a plurality of communication attributes associated with a communication; wherein the plurality of communication attributes includes: virtual token, an entity identifier identifying an entity associated with the initiator device, and a data content associated with communication request; determining, by the at least one processor, that the virtual token is a proxy profile identifier; wherein the proxy profile identifier identifies a plurality of actual data source profiles; wherein each actual data source profile of the plurality of actual data source profiles includes an actual profile identifier different from the proxy profile identifier; determining, by the at least one processor, based at least in part on the plurality of communication attributes, at least one split rule defining a proportion of the data content to be attributed to each actual data source profile of the plurality of actual data source profiles; determining, by the at least one processor, at least one security sub-score for each actual data source profile of the plurality of actual data source profiles based at least in part on the proportion of the data content attributed to each actual data source profile of the plurality of actual data source profiles; determining, by the at least one processor, a security score associated with the virtual token based at least in part on an aggregation of the at least one security sub-score for each actual data source profile of the plurality of actual data source profiles; determining, by the at least one processor, a communication request authorization based at least in part on the security score exceeding a threshold security score; accessing, by the at least one processor, each actual data source profile of the plurality of actual data source profiles to access the proportion of the data content of each actual data source profile of the plurality of actual data source profiles; consolidating, by the at least one processor, the proportion of the data content accessed from each actual data source profile of the plurality of actual data source profiles into a single response; and executing, by the at least one processor, the electronic activity with the single response.

In some aspects, the techniques described herein relate to a method, further including: utilizing, by the at least one processor, a data split prediction machine learning model to predict at least one predicted split rule based at least in part on: each actual data source profile of the plurality of actual data source profiles, and a data entry history associated with each actual data source profile of the plurality of actual data source profiles.

In some aspects, the techniques described herein relate to a method, further including: configuring, by the at least one processor, the at least one data split rule according to the at least one predicted data split rule.

In some aspects, the techniques described herein relate to a method, further including: receiving, by the at least one processor, at least one data split rule configuration via user input from at least one user device associated with at least one actual data source profile of the plurality of actual data source profiles; configuring, by the at least one processor, the at least one data split rule according to the at least one data split rule configuration; and training, by the at least one processor, the data split prediction machine learning model based at least in part on an error between the at least one predicted data split rule and the at least one data split rule configuration.

In some aspects, the techniques described herein relate to a method, wherein the communication request includes a transaction authorization request, the communication includes a transaction and the data content includes a transaction value.

In some aspects, the techniques described herein relate to a method, wherein the at least one data split rule includes at least one of: a time period restriction restricting a validity of the virtual token to a particular time period, a geofenced restriction restricting the validity of the virtual token to a particular geographic area, an approved entity list identifying a set of approved entities for use of the virtual token, of an unapproved entity list identifying a set of unapproved entities for use of the virtual token.

In some aspects, the techniques described herein relate to a method, further including screening, by the at least one processor, the communication request based at least in part on: the at least one data split rule and the plurality of communication attributes; wherein the plurality of communication attributes further includes: at least one location identifier identifying a geographic location associated with the communication request, and a time attribute identifying a time associated with the communication request.

In some aspects, the techniques described herein relate to a method, further including: generating, by the at least one processor, a plurality of split communication requests for the plurality of actual data source profiles based at least in part on the proportion of the data content to be attributed to each actual data source profile of the plurality of actual data source profiles; wherein each split communication request of the plurality of split communication requests includes a data content split associated each actual data source profile of the plurality of actual data source profiles based on the proportion of the data content; and recording, by the at least one processor, each respective split communication request in a data entry history associated with a respective source profile of the plurality of actual data source profiles.

In some aspects, the techniques described herein relate to a method, further including determining, by the at least one processor, the at least one security score for each actual data source profile of the plurality of actual data source profiles based at least in part on each split communication request of the plurality of split communication requests.

In some aspects, the techniques described herein relate to a method, further including: receiving, by the at least one processor, a communication reversal request associated with the communication; wherein the communication reversal request includes at least one reversal attribute including: the virtual token, the entity identifier identifying the entity associated with the communication, and a data content reversal identifying at least a portion of the data content to be reversed; determining, by the at least one processor, based at least in part on the virtual token, the proportion of the data content accessed in each actual data source profile of the plurality of actual data source profiles associated with the communication; accessing, by the at least one processor, each actual data source profile of the plurality of actual data source profiles to reverse the access to at least a portion of the proportion of the data content of each actual data source profile of the plurality of actual data source profiles based at least in part on the data content reversal and the at least one split rule.

In some aspects, the techniques described herein relate to a method, further including returning, by the at least one processor, the at least the portion of the proportion of the data content of each actual data source profile of the plurality of actual data source profiles to each actual data source profile so as to reverse the access.

In some aspects, the techniques described herein relate to a system including: at least one processor configured to perform steps to: receive a communication request associated with an electronic activity being executed at an initiator device; wherein the communication request includes a plurality of communication attributes associated with a communication; wherein the plurality of communication attributes includes: virtual token, an entity identifier identifying an entity associated with the initiator device, and a data content associated with communication request; determine that the virtual token is a proxy profile identifier; wherein the proxy profile identifier identifies a plurality of actual data source profiles; wherein each actual data source profile of the plurality of actual data source profiles includes an actual profile identifier different from the proxy profile identifier; determine based at least in part on the plurality of communication attributes, at least one split rule defining a proportion of the data content to be attributed to each actual data source profile of the plurality of actual data source profiles; determine at least one security sub-score for each actual data source profile of the plurality of actual data source profiles based at least in part on the proportion of the data content attributed to each actual data source profile of the plurality of actual data source profiles; determine a security score associated with the virtual token based at least in part on an aggregation of the at least one security sub-score for each actual data source profile of the plurality of actual data source profiles; determine a communication request authorization based at least in part on the security score exceeding a threshold security score; access each actual data source profile of the plurality of actual data source profiles to access the proportion of the data content of each actual data source profile of the plurality of actual data source profiles; consolidate the proportion of the data content accessed from each actual data source profile of the plurality of actual data source profiles into a single response; and execute the electronic activity with the single response.

In some aspects, the techniques described herein relate to a system, wherein the at least one processor is further configured to perform steps to: utilize a data split prediction machine learning model to predict at least one predicted split rule based at least in part on: each actual data source profile of the plurality of actual data source profiles, and a data entry history associated with each actual data source profile of the plurality of actual data source profiles.

In some aspects, the techniques described herein relate to a system, wherein the at least one processor is further configured to perform steps to: configure the at least one data split rule according to the at least one predicted data split rule.

In some aspects, the techniques described herein relate to a system, wherein the at least one processor is further configured to perform steps to: receive at least one data split rule configuration via user input from at least one user device associated with at least one actual data source profile of the plurality of actual data source profiles; configure the at least one data split rule according to the at least one data split rule configuration; and train the data split prediction machine learning model based at least in part on an error between the at least one predicted data split rule and the at least one data split rule configuration.

In some aspects, the techniques described herein relate to a system, wherein the communication request includes a transaction authorization request, the communication includes a transaction and the data content includes a transaction value.

In some aspects, the techniques described herein relate to a system, wherein the at least one data split rule includes at least one of: a time period restriction restricting a validity of the virtual token to a particular time period, a geofenced restriction restricting the validity of the virtual token to a particular geographic area, an approved entity list identifying a set of approved entities for use of the virtual token, of an unapproved entity list identifying a set of unapproved entities for use of the virtual token.

In some aspects, the techniques described herein relate to a system, wherein the at least one processor is further configured to perform steps to screen the communication request based at least in part on: the at least one data split rule and the plurality of communication attributes; wherein the plurality of communication attributes further includes: at least one location identifier identifying a geographic location associated with the communication request, and a time attribute identifying a time associated with the communication request.

In some aspects, the techniques described herein relate to a system, wherein the at least one processor is further configured to perform steps to: generate a plurality of split communication requests for the plurality of actual data source profiles based at least in part on the proportion of the data content to be attributed to each actual data source profile of the plurality of actual data source profiles; wherein each split communication request of the plurality of split communication requests includes a data content split associated each actual data source profile of the plurality of actual data source profiles based on the proportion of the data content; and record each respective split communication request in a data entry history associated with a respective source profile of the plurality of actual data source profiles.

In some aspects, the techniques described herein relate to a method including: receiving, by at least one processor, a communication request including a virtual token that addresses the communication request to a proxy profile identifier; wherein the communication request includes: an entity identifier identifying an entity associated with the communication request, and a data content associated with communication request; routing, by the at least one processor, based on the virtual token, the communication request to a plurality of actual data source profiles associated with the proxy profile identifier; determining, by the at least one processor, based at least in part on the plurality of communication attributes, at least one split rule defining a proportion of the data content to be attributed to each actual data source profile of the plurality of actual data source profiles; determining, by the at least one processor, at least one security sub-score for each actual data source profile of the plurality of actual data source profiles based at least in part on the proportion of the data content attributed to each actual data source profile of the plurality of actual data source profiles; determining, by the at least one processor, a security score associated with the virtual token based at least in part on an aggregation of the at least one security sub-score for each actual data source profile of the plurality of actual data source profiles; determining, by the at least one processor, a communication request authorization based at least in part on the security score exceeding a threshold security score; authorizing, by the at least one processor, at least one communication associated with the communication request based at least in part on the communication request authorization.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 depicts an illustrative flowchart for an exemplary computer-based method for efficient and secure multi-user electronic activities, including splitting data and/or processes across multiple user profiles using a virtual token gateway to cooperatively perform an electronic activity in accordance with one or more embodiments of the present disclosure

DETAILED DESCRIPTION

Figure 1A:
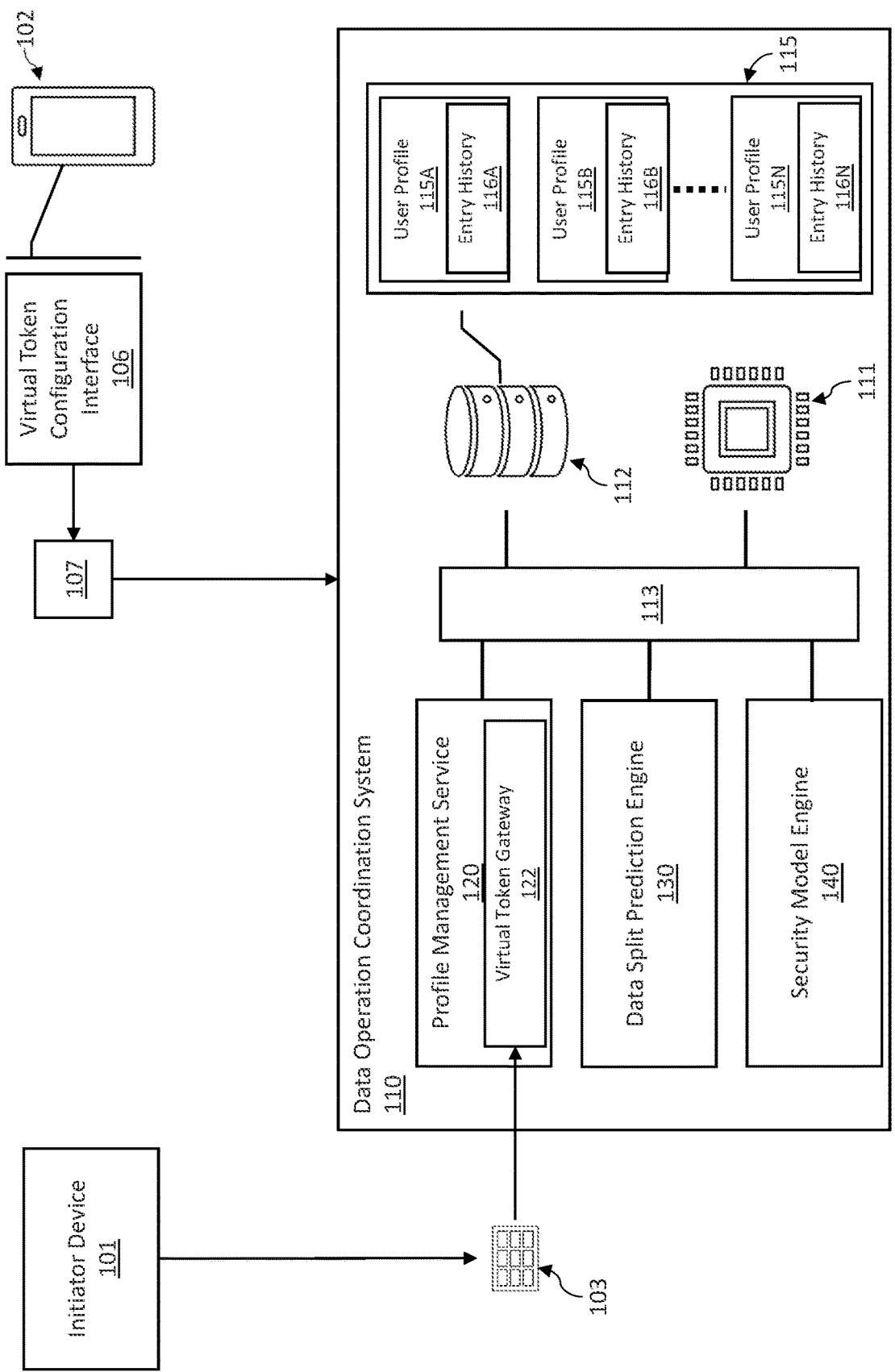
FIG. 1A illustrates an illustrative system for efficient and secure multi-user electronic activities, including splitting data and/or processes across multiple user profiles using a virtual token gateway to cooperatively perform an electronic activity in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1A through 6 illustrate systems and methods of splitting data of an electronic activity across multiple user profiles to enable secure and efficient multi-user electronic activities. The following embodiments provide technical solutions and technical improvements that overcome technical problems, drawbacks and/or deficiencies in the technical fields involving coordination and management of data and user profiles including routing of communications and contributions to a communication, to effectuate a multi-user operation in an electronic and/or online environment. Such multi-user operations typically require additional user profiles to act as intermediaries and/or manual splitting and/or combining of data to effectuate the multi-user operation. As explained in more detail, below, technical solutions and technical improvements herein include aspects of improved token-based routing and multi-user threat detection for data operations in multi-user electronic activities for more efficient and secure multi-user operations in electronic and/or online environments. The virtual token described below may act as a data gateway to route and manage data operations performed by and for each user for the multi-user operation. Based on such technical features, further technical benefits become available to users and operators of these systems and methods. Moreover, various practical applications of the disclosed technology are also described, which provide further practical benefits to users and operators that are also new and useful improvements in the art.

Figure 1B:
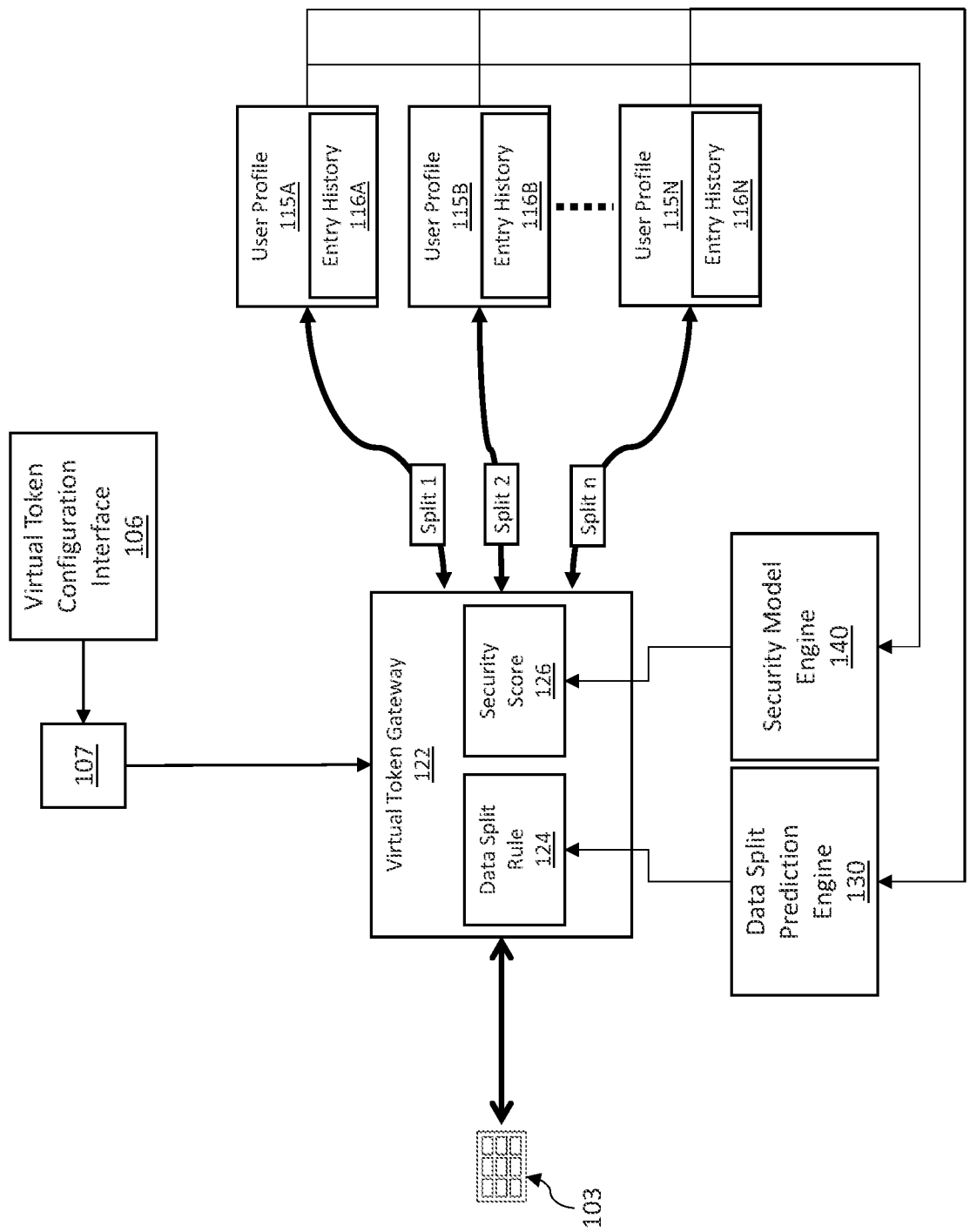
FIG. 1B illustrates an illustrative system for efficient and secure multi-user electronic activities, including splitting data and/or processes across multiple user profiles using a virtual token gateway to cooperatively perform an electronic activity in accordance with one or more embodiments of the present disclosure.

FIG. 1A and FIG. 1B are block diagrams of an exemplary computer-based system and platform for secure and efficient data splitting across user profiles using a virtual token gateway for profile-related electronic activities in accordance with one or more embodiments of the present disclosure.

In some embodiments, a data operation coordination system 110 may be in communication with at least one user device 102 and at least one initiator device 101, e.g., across one or more networks. The data operation coordination system 110 may include computer engines, including software and/or hardware components for coordinating data splitting across user profiles 115 to facilitate automated multi-user operations in response to communications 103 from the initiator device 101.

In some embodiments, the coordinate data splitting in a secure and efficient manner, the data operation coordination system 110 may include a profile management service 120 to access and manage the user profiles 115, including user profile 115A, user profile 115B through user profile 115N. The profile management service 120 may utilize a virtual token gateway 122 to process and/or split requests associated with the communication 103 across the user profiles 115A through 115N to provide individual split requests to each user profile 115A through 115N.

In some embodiments, the data operation coordination system 110 may include a data split prediction engine 130 to predictively generate data split rules for user by the profile management service 120. In some embodiments, the data operation coordination system 110 may include a security model engine 140 to assess security and/or risk associated with each user profile 115A through 115N relative to participation in the multi-user operation.

In some embodiments, the profile management service 120, the data split prediction engine 130 and/or the security model engine 140 may be interconnected with a datastore 112 and at least one processor 111, e.g., via a bus 113.

In some embodiments, the processor 111 may include local or remote processing components. In some embodiments, the processor 111 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 111 may include data-processing capacity provided by the microprocessor. In some embodiments, the microprocessor may include memory, processing, interface resources, controllers, and counters. In some embodiments, the microprocessor may also include one or more programs stored in memory.

Similarly, in some embodiments, the datastore 112 may include one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the datastore 112 may include, e.g., a suitable non-transient computer readable medium such as, e.g., random access memory (RAM), read only memory (ROM), one or more buffers and/or caches, among other memory devices or any combination thereof.

In some embodiments, the terms "computer engine" and "engine", such as the profile management service 120, the data split prediction engine 130 and/or the security model engine 140, identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints. In some embodiments, the profile management service 120, the data split prediction engine 130 and/or the security model engine 140 may share hardware resources, including the processor 111 and datastore 112 of the data operation coordination system 110 via, e.g., the bus 113.

In some embodiments, a user may interact with the user device 102 via a virtual token configuration interface 106. The virtual token configuration split interface 106 provides user interface (UI) elements that enable the user to select rule options for data split rules, input data split rules, select and/or input profile identifiers associated with user profiles 115A through 115N to be linked to the data split rules, among other data split rule configuration parameters or any combination thereof.

In some embodiments, the data split rule configuration parameters may include, e.g., the user profiles 115A through 115N associated with the data split rule percentage of data, specific data portions, specific operation portions, a time period restriction restricting a validity of the virtual token to a particular time period, a geofenced restriction restricting the validity of the virtual token to a particular geographic area, an approved entity list identifying a set of approved entities for use of the virtual token, an unapproved entity list identifying a set of unapproved entities for use of the virtual token, among other parameters and/or rules or any suitable combination there.

In some embodiments, in response to user selection and/or input of the data split rule configuration parameters, the user device 102 may communicate a data split rule configuration 107 to the data operation coordination system 110. In some embodiments, the data split rule configuration 107 may include a suitable communication for carrying the data split rule configuration parameters, such as, e.g., an application programming interface (API) request, a hypertext transport protocol (HTTP) request, or any other suitable messaging and/or transport protocol for conveying data from one computing resource to another.

In some embodiments, the term "application programming interface" or "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the profile management service 120 may receive the data split rule configuration 107 and configure a data split amongst the specified user profiles 115A through 115N. To do so, the profile management service 120 may generate a virtual token to serve as a proxy for data communications to and from the user profiles 115A through 115N such that communications from the group of the user profiles 115A through 115N to another device, or from another device to the group of the user profiles 115A through 115N may be addressed according to the virtual token. For example, the virtual token may include a proxy user profile identifier, a proxy internet protocol (IP) address, a proxy network address, a proxy file system address, or any other suitable proxy identifier for acting as a proxy address for the group of the user profiles 115A through 115N. By using the virtual token as the proxy address for the group of the user profiles 115A through 115N, the virtual token gateway 122 may automatically manage the split of data contents across the user profiles 115A through 115N while communications may be performed in the aggregate.

For example, in some scenarios, a single communication to and from a single address may be advantageous, such as for a transaction to the split across multiple payers, an electronic message having content specific to each recipient, or other applications where a communication may be advantageously provided to a single address but where multiple users may be the intended recipient of at least a portion of the communication. For example, a sender of a communication may not have knowledge of each individual user applicable to a communication. The sender may then address the communication to the virtual token, and rerouting to the appropriate recipients, including splitting data contents to each individual user profile 115A through 115N may be performed on the back-end by the data operation coordination system 110.

In some embodiments, the datastore 112 may store records of each user profile 115. Accordingly, the profile management service 120 may link each user profile 115A through 115N specified in the data split rule configuration parameters to the virtual token. For example, the profile management service 120 may flag each user profile 115A through 115N as associated with the virtual token, encode a profile identifier of each user profile 115A through 115N in the virtual token, associated the profile identifier of each user profile 115A through 115N with the virtual token, or by any other suitable means to link each user profile 115A through 115N with the virtual token such that the virtual token gateway 122 may identify each user profile 115A through 115N based on the virtual token.

As a result, in some embodiments, the initiator device 101 may communicate a communication request 103 to the data operation coordination system 110 where the communication request 103 is addressed to the virtual token. The profile management service 120 may identify the address of the communication request 103 as being associated with the virtual token. Accordingly, the profile management service 120 may initiate the virtual token gateway 122 to process and reroute the communication request 103 based on the virtual token.

In some embodiments, the communication request 103 may include the address associated with the virtual token, an entity identifier identifying the entity associated with the initiator device, an initiator device identifier (ID) identifying the initiator device 101, an initiator device address identifying a network and/or file system address associated with the initiator device 101, a data content, among other data or any combination thereof. In some embodiments, the data content may include any suitable contents for delivery to the user profiles 115A through 115N, such as, e.g., a transaction amount and request for payment, a transaction amount and request for return of the transaction amount to the user profiles 115A through 115N, message contents (e.g., text, media, file, etc.), user profile modifications (e.g., attribute rewards to each user profile 115A through 115N, metadata modifications, profile linking information, etc.), among other data content or any combination thereof.

In some embodiments, the communication request 103 may also include metadata, such as, e.g., a time, date, location or other attribute associated with the communication request 103, the initiator device 101 and/or the entity associated with the communication request 103. In some embodiments, the virtual token gateway 122 may screen the communication request 103 based on the attributes of the metadata. As described above, the data split configuration parameters may include approved and/or unapproved entities, approved and/or unapproved times, dates and/or geographic areas. Accordingly, the virtual token gateway 122 may determine whether the communication request 103 is a permissible communication request 103 based on whether the metadata attributes are approved according to the data split configuration parameters. For example, the time attribute of the metadata may be compared to the time parameter of the data split configuration parameters to determine whether the time attribute of the communication request 103 is within the active period of the virtual token. Similarly, the date and/or location attributes may be compared to the date and/or geographic area parameters of the data split configuration parameters to determine whether the communication request 103 is within the active date(s) and/or geographic area of the virtual token. In some embodiments, the entity associated with the communication request 103 may be compared to the approved and/or unapproved list of entity identifiers to determine whether the virtual token may be active for the entity. Other suitable parameters for screening the communication request 103 may be employed or any combination thereof.

In some embodiments, the virtual token gateway 122 may use the address of the virtual token specified in the communication request 103 to identify the virtual token and access the data split rule configuration associated with the virtual token and the user profiles 115A through 115N. The virtual token gateway 122 may extract data split rules 124 from the data split rule configuration that define how to address split communication requests across the user profiles 115A through 115N based on a split of the data contents of the communication request 103, where the split communication requests include separate automatically generated communication requests to each user profile 115A through 115N based on the communication request 103 and the data split rule configuration.

In some embodiments, the data split rules 124 may be extracted by accessing data split rules defined in the data split rule configuration parameters, or by automatically generating data split rules, e.g., via machine learning prediction, based on the data split rule configuration parameters. For example, as described above, the user at the user device 102 may select and/or input data split rules defining proportions and/or types of the data content to split and across which user profiles 115 the proportions and/or types of the data content are to be split. Alternatively, the user may select and/or input across which user profiles 115 the proportions and/or types of the data content are to be split without explicitly defining the proportions and/or types of the data content to be split.

In some embodiments, where the data split rules are not explicitly configured by the user, the virtual token gateway 122 may call the data split prediction engine 130 to predict one or more data split rules 124 for splitting the communication request 103 and the data contents thereof across the user profiles 115A through 115N. In some embodiments, the data split prediction engine 130 may utilize one or more data split prediction machine learning models to predict the data split rule 124 based on learned model parameters and an entry history 116A, 116B through 116N associated with each user profile 115A through 115N.

In some embodiments, the datastore 112 may store the entry history 116A, 116B through 116N associated with each user profile 115A through 115N to record data operations performed with each user profile 115A through 115N. Thus, the user profiles 115A through 115N may include a record of data operations including operations performed with a virtual token and a split communication request. Accordingly, the data split prediction engine 130 may be trained according to each entry history 116A through 116N to predict the data split rule 124 based on historical data entries regarding split communication requests for the user profiles 115A through 115N.

In some embodiments, the data split prediction engine 130 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

a. define Neural Network architecture/model,
    b. transfer the input data to the exemplary neural network model,
    c. train the exemplary model incrementally,
    d. determine the accuracy for a specific number of timesteps,
    e. apply the exemplary trained model to process the newly-received input data,
    f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the data split prediction engine 130 may predict for the virtual token and the communication request 103 the data split rule 124 for the user profiles 115A through 115N. The data split prediction engine 130 may provide the data split rule 124 to the virtual token gateway 122 to facilitate generating the split communication requests from the communication request 103.

In some embodiments, using the data split rule 124, the virtual token gateway 122 may determine a proportion of the data content associated with each user profile 115A through 115N. Based on the proportion of the data content attributed to each user profile 115A through 115N, the virtual token gateway 122 may reroute the split communication requests ("Split 1", "Split 2" through "Split N") to each user profile 115A through 115N with a respective portion of the proportion of the data content associated with each user profile 115A through 115N.

In some embodiments, to facilitate secure communications and prevent fraudulent communication requests, the virtual token gateway 122 may call a security model engine 140 to determine a security score 126 associated with each split communication request. The security score 126 may include, e.g., a risk score defining a level of risk of fraud and/or other malicious activity, a confidence score defining a level of confidence in the authenticity of the split communication requests, or other suitable security score 126 or any combination thereof.

In some embodiments, the security model engine 140 may access the user profiles 115A through 115N and the entry histories 116A through 116N associated therewith. Based on the entry histories 116A through 116N and the attributes of the communication request 103, the security model engine 140 may implement one or more security models to quantify the security score 126 to determine whether the communication request 103 is authentic or in-authentic based on the electronic activities of each user profile 115A through 115N.

In some embodiments, the security model may use data entries from the entry histories 116A through 116N for a window of time, such as, e.g., for the past week, month, year, 2 years, 3 years, 4 years, 5 years or more, or for any other suitable time window for assessing behavior associated with each user profile 115A through 115N. The behavior associated with each user profile 115A through 115N may be indicative of whether the communication request 103 is associated with one or more users of the user profiles 115A through 115N by determining a degree of similarity or correlation of the data entries in the window of time to the communication request 103. In some embodiments, in addition to or alternatively to the window of time, the security model may employ a time-based weighting of data entries, such as, e.g., a forgetting factor or other time-based weighting, that reduces the influence of older data entries relative to newer entries. For example, the time-based weighting may include a value based on age of the data entry the scales linearly, exponentially, logarithmically, or by any other suitable scale or any combination thereof with age of the data entry.

In some embodiments, the security model may identify the data entries from each entry history 116A through 116B that are associated with a virtual token, including the virtual token to which the communication request 103 has been sent, or to any other virtual token. Thus, the security model may determine the behavior of the user profiles 115A through 115N relative to split communications, such as, e.g., frequency of splitting communications, average split proportions for each user profile 115A through 115N in each split communication, average split magnitudes for each user profile 115A through 115N in each split communication, third party entities, time, date, etc.

In some embodiments, based on the behavior of each user profile 115A through 115N, the security model may determine the security score 126. In some embodiments, the security model may use a single step security score 126 that uses the data entries of the entry histories 116A through 116N of all user profiles 115A through 115N. Thus, the security model may ingest the data entries from each entry history 116A through 116N from the window of time and produce a single output representing a security score 126 for the communication request 103 relative to the user profiles 115A through 115N.

In some embodiments, the security model may produce separate security sub-scores for each user profile 115A through 115B. Thus, the security model may separately ingest the data entries from each entry history 116A through 116N from the window of time, and separately produce an output representing a security sub-score for each split communication relative to each respective user profile 115A through 115N. In some embodiments, the security model engine 140 may aggregate the security sub-scores to produce a final security score 126 for the communication request 103. For example, the security sub-scores may be used to form the final security score 126 based on, e.g., a range of the security sub-scores, an average of the security sub-scores, a sum of the security sub-scores, a product of the security sub-scores, a weighted average of the security sub-scores, a weighted sum of the security sub-scores, a weighted product of the security sub-scores, or any other suitable aggregation to form a security score 126 or any suitable combination thereof.

In some embodiments, the security model may include, e.g., any suitable algorithm, logic and/or machine learning model for evaluating the authenticity of a communication request regarding an electronic activity/event based on the event history of an associated user profile. For example, a regression model, classification model, clustering model, hidden Markov model, Bayesian classification/regression, or other suitable algorithm and/or model or any combination thereof, may be employed to ingest data entries and output a security score 126.

In some embodiments, the virtual token gateway 122 may compare the security score 126 to a predetermined security score 126 threshold to determine a communication request authorization. The predetermined security score 126 threshold may be a value that is selected to represent a minimum-security score 126 to authenticate the communication request 103. Where the security score 126 is below the predetermined security score 126 threshold, the virtual token gateway 122 may deny the communication request 103 without routing the split communication requests to each user profile 115A through 115N. Where the security score 126 meets or exceeds the predetermined security score 126 threshold, the virtual token gateway 122 may approve the communication request 103 and proceed to route each split communication request (Split 1, Split 2 through Split n) to each user profile 115A through 115N.

In some embodiments, upon routing each split communication request (Split 1, Split 2 through Split n), each user profile 115A through 115N may respond or be managed (by the profile management service 120) to respond to each split communication request (Split 1, Split 2 through Split n). In some embodiments, such response may include accessing the proportion of the data content associated with each user profile 115A through 115N as specified in the data split rules and each split communication request (Split 1, Split 2 through Split n). Thus, in response, the proportion of the data content associated with each user profile 115A through 115N may be added to respective split communication responses for each user profile 115A through 115N, where each split communication response carries the proportion of the data content requested of each user profile 115A through 115N.

In some embodiments, each split communication response may be formatted as a data entry addressed to the virtual token and/or to the initiator device 101 from each respective user profile 115A through 115N. Thus, each split communication response may form user profile specific data entries associated with the communication request 103 in order to allow each user profile 115A through 115N to record participation in response to the split communication request 103, e.g., via the virtual token. In some embodiments, each split communication request (Split 1, Split 2 through Split n) and/or each split communication response may be added as a new data entry into each respective entry history 116A through 116N to record the proportion of data content contributed by each user profile 115A through 115N to execute the electronic activity.

In some embodiments, each split communication response may be provided to the virtual token gateway 122. The virtual token gateway 122 may consolidate the split communication responses into a single communication response addressed to the initiator device 101 and/or the entity associated with the initiator device 101 from the virtual token. Each proportion of the data content provided from each user profile 115A through 115N may be combined into an aggregated data content that combines the contributions of each user profile 115A through 115N. For example, in a response to a transaction authorization request, the data content may include a funds approval for a particular amount associated with a transaction executed at the initiator device 101. Thus, the user profiles 115A through 115N may each contribute a proportion of the funds via split funds approvals, which may be combined into a transaction authorization message from the virtual token for the total funds amount, where the total funds amount is the aggregation of each proportion of each user profile 115A through 115N. Each user profile 115A through 115N may record the respective split communication requests including a split transaction authorization request for each proportion of the funds and may return a split transaction authorization for each proportion of the funds. Thus, each user profile 115A through 115N may record each respective contribution while the consolidated response may be recorded for the virtual token.

In some embodiments, the virtual token may include an entry history which may record the communication request 103, each split communication request, each split communication request response, and/or the communication request response. Thus, the virtual token may form a virtual profile that records split activities and as well as enabling the routing of the communication request 103 via the split communication requests. In some embodiments, the entry history of the virtual token may be a part of a primary user profile, e.g., user profile 115A. For example, the user that provided the data split rule configuration 107 may be record, with an additional entry history or within the entry history 116A, the communication request 103 and/or the communication request response. Thus, an additional profile for the virtual token can be avoided.

In some embodiments, the electronic activity can be reversed with a subsequent communication request from the initiator device 101. In some embodiments, the subsequent communication request may include, e.g., a reference to the communication request 103, an address to the virtual token, the entity identifier identifying the entity associated with the subsequent communication request (and the communication request 103), a data content reversal identifying at least a portion of the data content to be reversed, and any other reversal attributes associated with the reversal or any combination thereof. In some embodiments, the profile management service 120 and the virtual token gateway 122 may process the subsequent communication request in a similar fashion to the communication request 103 with the exception that the data content is returned to the user profiles 115A through 115N according to the data split rules rather than contributed by the user profiles 115A through 115N. Thus, the virtual token gateway 122 may determine, based at least in part on the virtual token, the proportion of the data content accessed in each actual data source profile of the plurality of actual data source profiles associated with the communication request 103, access each user profile 115A through 115N to reverse the access to the proportion of the data content of each user profile 115A through 115N based at least in part on the data content reversal and the data split rule. Each respective proportion of the data content may then be provided each user profile 115A through 115N to reverse at least a portion of each split communication request, e.g., by or include recording the data content reversal in each entry history 116A through 116N. In some embodiments, the data content reversal may be made according to the original data split rule of the data split rule configuration 107 or may be subject to a separate data split rule, e.g., specific to communication reversal requests or to the specific subsequent communication or both.

Figure 2A:
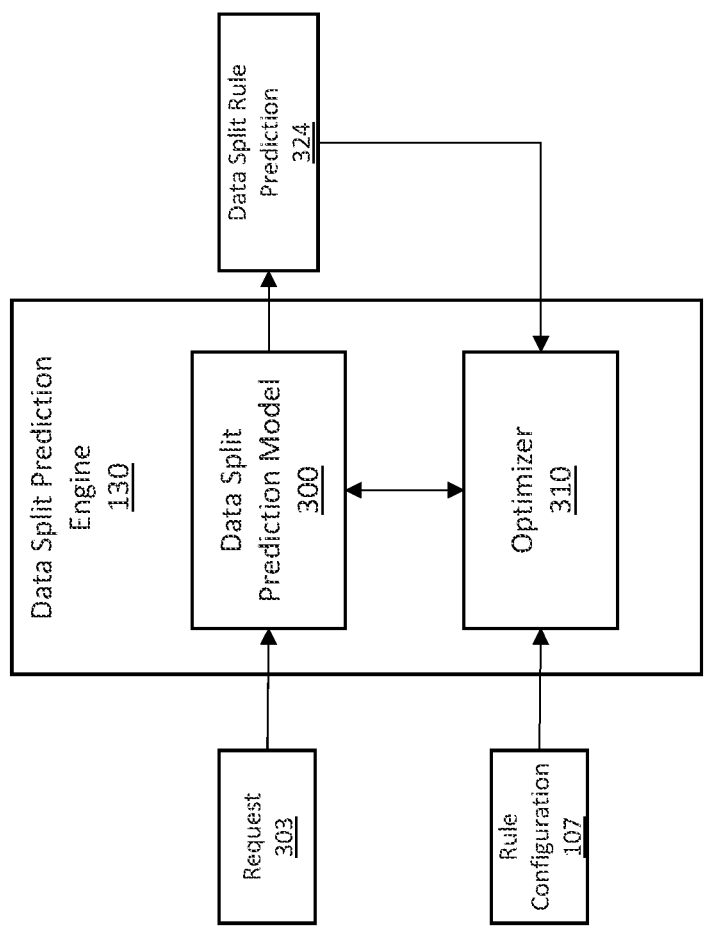
FIG. 2A illustrates an illustrative computer engine for machine learning-based predictive data splitting across user profiles for profile-related electronic activities in accordance with one or more embodiments of the present disclosure.
Figure 2B:
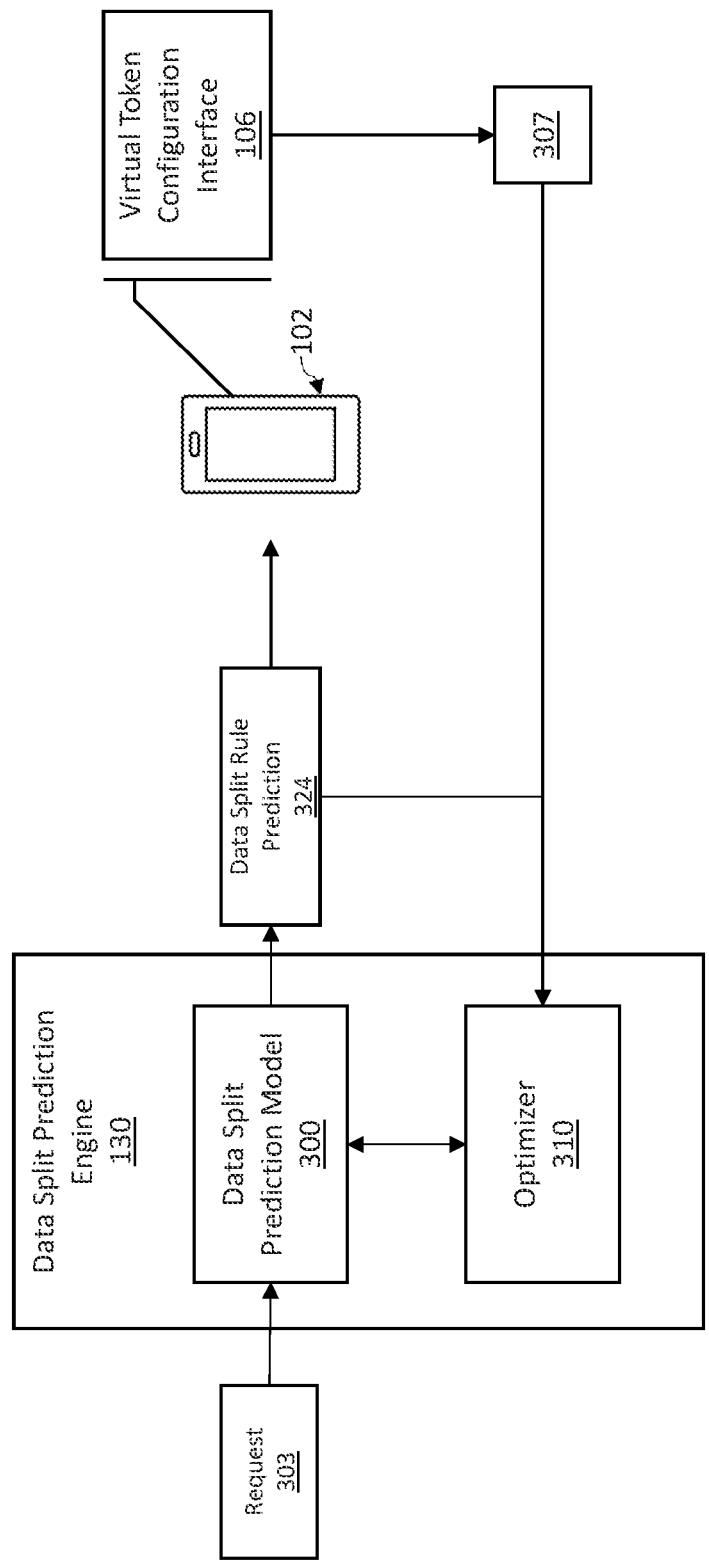
FIG. 2B illustrates an illustrative computer engine for machine learning-based predictive data splitting across user profiles for profile-related electronic activities in accordance with one or more embodiments of the present disclosure.

FIG. 2A and FIG. 2B are block diagrams of a computer engine for machine learning-based predictive data splitting across user profiles for profile-related electronic activities in accordance with one or more embodiments of the present disclosure.

In some embodiments, the data split prediction engine 130 may utilize the data split prediction model 300 to predict a data split rule prediction 324 associated with the user.

In some embodiments, the data split prediction model 300 ingests a feature vector that encodes features representative of a communication request 303, such as the communication request 103 described above or other request. In some embodiments, the data split prediction model 300 processes the feature vector with parameters to produces a prediction of a data split rule prediction 324 that define a proportion of data contents split across user profiles. In some embodiments, the user profiles subject to the data split rule prediction 324 may be predefined according to the data split rule configuration 107 provided by the user via the virtual token configuration interface 106 or may be automatically identified by the data split prediction model 300. In some embodiments, the parameters of the data split prediction model 300 may be implemented in a suitable machine learning model including a prediction machine learning model, such as, e.g., Linear Regression, Logistic Regression, Ridge Regression, Lasso Regression, Polynomial Regression, Bayesian Linear Regression (e.g., Naive Bayes regression), a convolutional neural network (CNN), a recurrent neural network (RNN), decision trees, random forest, support vector machine (SVM), K-Nearest Neighbors, or any other suitable algorithm for predicting output values based on input values. In some embodiments, for computational efficiency while preserving accuracy of predictions, the data split prediction model 300 may advantageously include a random forest model.

In some embodiments, the data split prediction model 300 processes the features encoded in the feature vector by applying the parameters of the prediction machine learning model to produce a model output vector. In some embodiments, the model output vector may be decoded to generate one or more numerical output values indicative of the proportion associated with each user profile, e.g., as a percentage, a decimal value, a fraction or other suitable expression of a proportion. In some embodiments, the model output vector may include or may be decoded to reveal the output value(s) based on a modelled correlation between the feature vector and a target output.

In some embodiments, the parameters of the data split prediction model 300 may be trained based on known outputs. For example, as illustrated in FIG. 2A, the communication request 303 may be paired with a target value or known value of the data split rule configuration 107 to form a training pair. The user may input and/or select the proportions associated with each user profile in the data split rule configuration 107, which may be used as the ground truth for evaluation of the data split rule prediction 324. Thus, in some embodiments, the communication request 303 may be provided to the data split prediction model 300, e.g., encoded in a feature vector, to produce the data split rule prediction 324, and an optimizer 310 associated with the data split prediction model 300 may then compare the data split rule prediction 324 with the ground truth of the data split rule configuration 107 to determine an error of the data split rule prediction 324. Thus, the data split prediction model 300 may be initially trained based on explicitly configured proportions for each user profile for each virtual token.

In some embodiments, as illustrated in FIG. 2B, the known output may be obtained after the data split prediction model 300 produces the prediction, such as in online learning scenarios. In such a scenario, the data split prediction model 300 may receive the communication request 303 and generate the model output vector to produce an output value representing the data split rule prediction 324. Subsequently, a user may provide feedback by, e.g., modifying, adjusting, removing, and/or verifying the output value via the virtual token configuration interface 106 on the user computing device 102. The feedback may be paired with the communication request 303 to form the training pair and the optimizer 310 may determine an error of the predicted output value using the feedback.

In some embodiments, the optimizer 310 may employ a loss function, such as, e.g., Hinge Loss, Multi-class SVM Loss, Cross Entropy Loss, Negative Log Likelihood, or other suitable classification loss function to determine the error of the predicted output value based on the known output. In some embodiments, based on the error, the optimizer 310 may update the parameters of the data split prediction model 300 using a suitable training algorithm such as, e.g., backpropagation for a prediction machine learning model. In some embodiments, backpropagation may include any suitable minimization algorithm such as a gradient method of the loss function with respect to the weights of the prediction machine learning model. Examples of suitable gradient methods include, e.g., stochastic gradient descent, batch gradient descent, mini-batch gradient descent, or other suitable gradient descent technique. As a result, the optimizer 310 may update the parameters of the data split prediction model 300 to train the data split prediction model 300 to model the correlation between communication requests and data split rules (e.g., the proportion of data content splitting) in order to produce more accurate outputs.

FIG. 3 depicts a flowchart for an exemplary computer-based method for efficient and secure multi-user electronic activities, including splitting data and/or processes across multiple user profiles using a virtual token gateway to cooperatively perform an electronic activity in accordance with one or more embodiments of the present disclosure In some embodiments, the facilitate data splitting according to a data split rule configuration defining proportions of data content to split across user profiles, at least one processor of a data operation coordination system 110 may be configured to implement steps to receive, split and route a communication request to allow an initiator device 101 to execute an electronic activity based on data content split across user profiles. To do so, the processor(s) may utilize a virtual token and a virtual token gateway 122 to enable processing and rerouting of a single communication request.

In some embodiments, at step 301, the processor(s) may receive a communication request associated with an electronic activity being executed at an initiator device. In some embodiments, the communication request may include communication attributes associated with a communication. In some embodiments, the communication attributes may include a virtual token, an entity identifier identifying an entity associated with the initiator device, and a data content associated with communication request.

In some embodiments, at step 302, the processor(s) may determine the virtual token is a proxy profile identifier. In some embodiments, the proxy profile identifier identifies actual user profiles. In some embodiments, each actual user profile of the actual user profiles may include an actual profile identifier different from the proxy profile identifier.

In some embodiments, at step 303, the processor(s) may determine, based at least in part on the communication attributes, at least one split rule defining a proportion of the data content to be attributed to each actual user profile of the actual user profiles.

In some embodiments, at step 304, the processor(s) may determine at least one security sub-score for each actual user profile of the actual user profiles based at least in part on the proportion of the data content attributed to each actual user profile of the actual user profiles.

In some embodiments, at step 305, the processor(s) may determine a security score 126 associated with the virtual token based at least in part on an aggregation of the at least one security sub-score for each actual user profile of the actual user profiles.

In some embodiments, at step 306, the processor(s) may determine a communication request authorization based at least in part on the security score 126 exceeding a threshold security score 126.

In some embodiments, at step 307, the processor(s) may access each actual user profile of the actual user profiles to access the proportion of the data content of each actual user profile of the actual user profiles.

In some embodiments, at step 308, the processor(s) may consolidate the proportion of the data content accessed from each actual user profile of the actual user profiles into a single response.

In some embodiments, at step 309, the processor(s) may execute the electronic activity with the single response.

Figure 4:
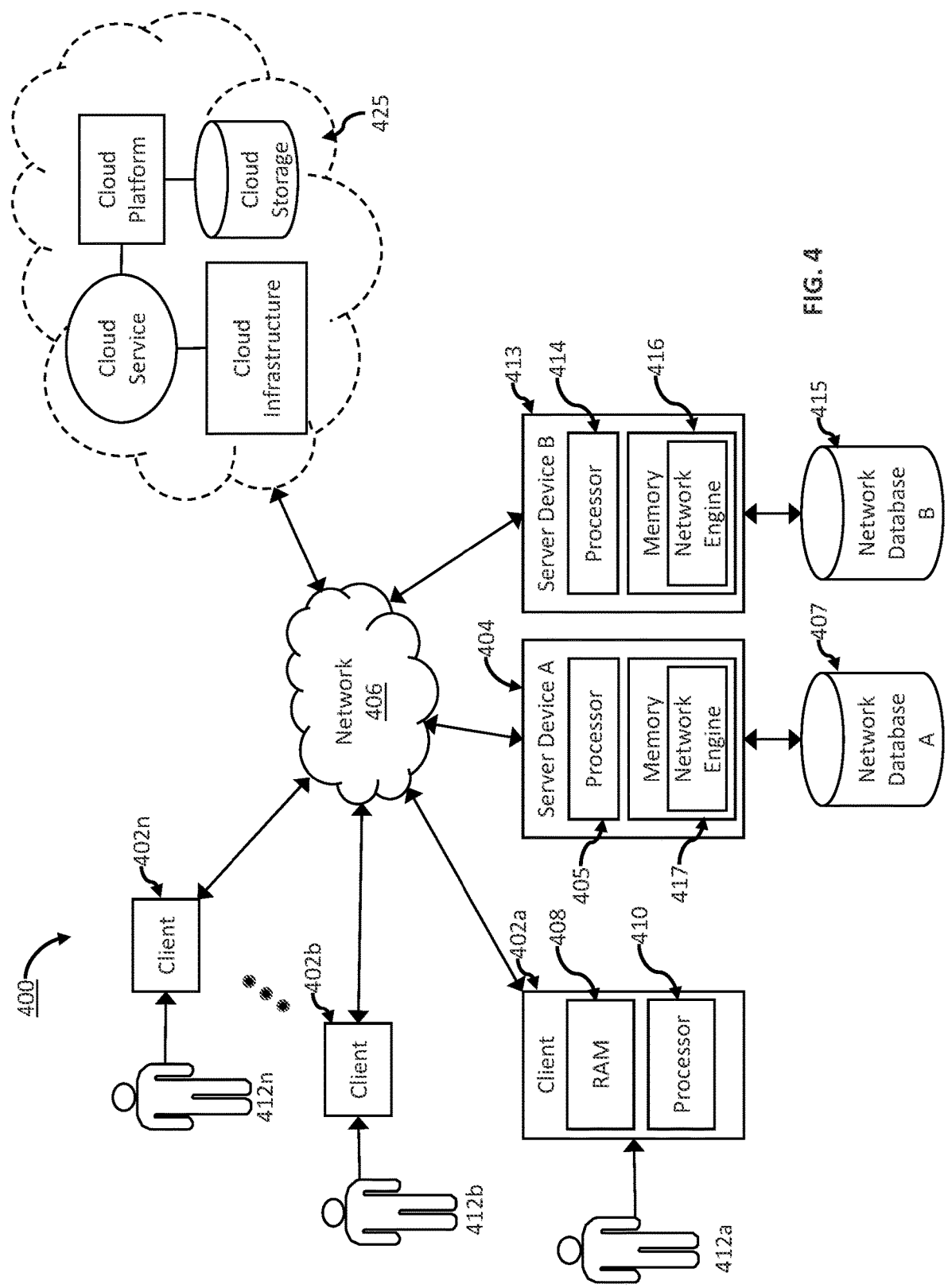
FIG. 4 depicts an illustrative block diagram of another exemplary computer-based system and platform for efficient and secure multi-user electronic activities, including splitting data and/or processes across multiple user profiles using a virtual token gateway to cooperatively perform an electronic activity in accordance with one or more embodiments of the present disclosure.

FIG. 4 depicts a block diagram of another exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device/client 402a, member computing device 402b through member computing device 402n shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices/clients 402a through 402n may also comprise a number of external or internal devices such as a mouse, a CD-ROM, DVD, a physical or virtual keyboard, a display, or other input or output devices. In some embodiments, examples of member computing devices/clients 402a through 402n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, member computing devices/clients 402a through 402n may be specifically programmed with one or more application programs in accordance with one or more principles/methodologies detailed herein. In some embodiments, member computing devices/clients 402a through 402n may operate on any operating system capable of supporting a browser or browser-enabled application, such as Microsoft™, Windows™, and/or Linux. In some embodiments, member computing devices 402a through 402n shown may include, for example, personal computers executing a browser application program such as Microsoft Corporation's Internet Explorer™, Apple Computer, Inc.'s Safari™, Mozilla Firefox, and/or Opera. In some embodiments, through the member computing devices/clients 402a through 402n, user 412a, user 412b through user 412n, may communicate over the exemplary network 406 with each other and/or with other systems and/or devices coupled to the network 406. As shown in FIG. 4, exemplary server devices 404 and 413 may include processor 405 and processor 414, respectively, as well as memory 417 and memory 416, respectively. In some embodiments, the server devices 404 and 413 may be also coupled to the network 406. In some embodiments, one or more member computing devices/clients 402a through 402n may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
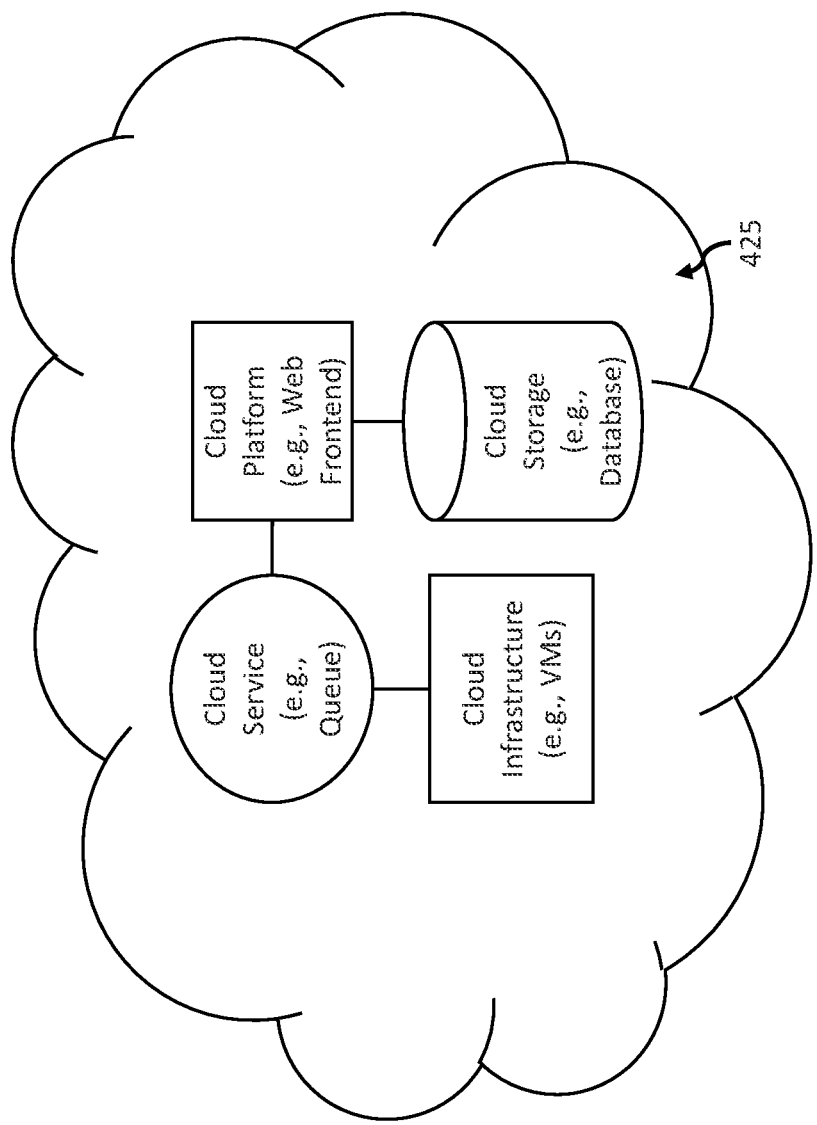
FIG. 5 depicts an illustrative schematic of an exemplary implementation of the cloud computing architecture in which embodiments of a system for efficient and secure multi-user electronic activities, including splitting data and/or processes across multiple user profiles using a virtual token gateway to cooperatively perform an electronic activity may be specifically configured to operate in accordance with some embodiments of the present disclosure.
Figure 6:
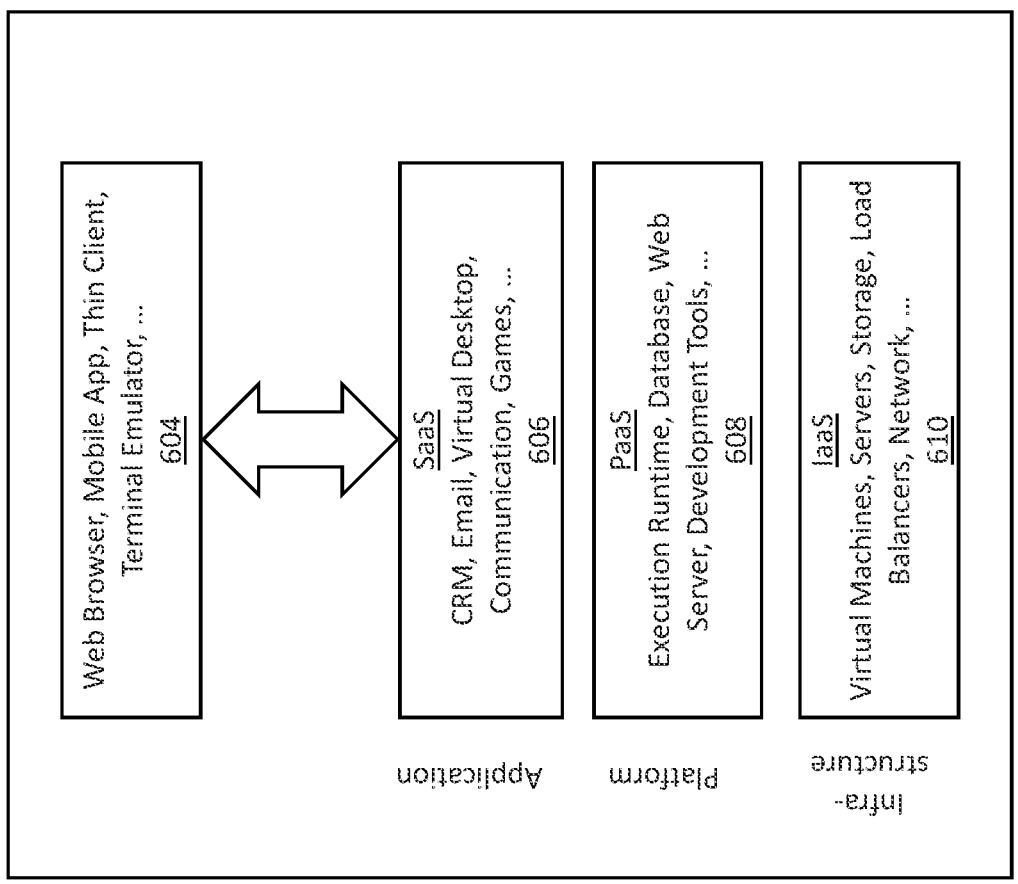
FIG. 6 depicts an illustrative schematic of another exemplary implementation of the cloud computing architecture in which embodiments of a system for efficient and secure multi-user electronic activities, including splitting data and/or processes across multiple user profiles using a virtual token gateway to cooperatively perform an electronic activity may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 425 such as, but not limiting to: infrastructure a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative and not restrictive.

At least some aspects of the present disclosure will now be described with reference to the following numbered clauses.

1. A method including:
  receiving, by at least one processor, a communication request associated with an electronic activity being executed at an initiator device;
    where the communication request includes a plurality of communication attributes associated with a communication;
    where the plurality of communication attributes includes:
      virtual token, an entity identifier identifying an entity associated with the initiator device, and
a data content associated with communication request;
determining, by the at least one processor, that the virtual token is a proxy profile identifier;
where the proxy profile identifier identifies a plurality of actual data source profiles;
where each actual data source profile of the plurality of actual data source profiles includes an actual profile identifier different from the proxy profile identifier;
determining, by the at least one processor, based at least in part on the plurality of communication attributes, at least one split rule defining a proportion of the data content to be attributed to each actual data source profile of the plurality of actual data source profiles;
determining, by the at least one processor, at least one security sub-score for each actual data source profile of the plurality of actual data source profiles based at least in part on the proportion of the data content attributed to each actual data source profile of the plurality of actual data source profiles;
determining, by the at least one processor, a security score associated with the virtual token based at least in part on an aggregation of the at least one security sub-score for each actual data source profile of the plurality of actual data source profiles;
determining, by the at least one processor, a communication request authorization based at least in part on the security score exceeding a threshold security score;
accessing, by the at least one processor, each actual data source profile of the plurality of actual data source profiles to access the proportion of the data content of each actual data source profile of the plurality of actual data source profiles;
consolidating, by the at least one processor, the proportion of the data content accessed from each actual data source profile of the plurality of actual data source profiles into a single response; and
executing, by the at least one processor, the electronic activity with the single response.

2. A system including:
at least one processor configured to perform steps to:
receive a communication request associated with an electronic activity being executed at an initiator device;
where the communication request includes a plurality of communication attributes associated with a communication;
where the plurality of communication attributes includes:
virtual token,
an entity identifier identifying an entity associated with the initiator device, and
a data content associated with communication request;
determine that the virtual token is a proxy profile identifier;
where the proxy profile identifier identifies a plurality of actual data source profiles;
where each actual data source profile of the plurality of actual data source profiles includes an actual profile identifier different from the proxy profile identifier;
determine based at least in part on the plurality of communication attributes, at least one split rule defining a proportion of the data content to be attributed to each actual data source profile of the plurality of actual data source profiles;
determine at least one security sub-score for each actual data source profile of the plurality of actual data source profiles based at least in part on the proportion of the data content attributed to each actual data source profile of the plurality of actual data source profiles;
determine a security score associated with the virtual token based at least in part on an aggregation of the at least one security sub-score for each actual data source profile of the plurality of actual data source profiles;
determine a communication request authorization based at least in part on the security score exceeding a threshold security score;
access each actual data source profile of the plurality of actual data source profiles to access the proportion of the data content of each actual data source profile of the plurality of actual data source profiles;
consolidate the proportion of the data content accessed from each actual data source profile of the plurality of actual data source profiles into a single response; and
execute the electronic activity with the single response.

3. The method of any of clauses 1 through 2, further including:
utilizing, by the at least one processor, a data split prediction machine learning model to predict at least one predicted split rule based at least in part on:
each actual data source profile of the plurality of actual data source profiles, and
a data entry history associated with each actual data source profile of the plurality of actual data source profiles.

4. The method of any of clauses 1 through 3, further including:
configuring, by the at least one processor, the at least one data split rule according to the at least one predicted data split rule.

5. The method of any of clauses 1 through 4, further including:
receiving, by the at least one processor, at least one data split rule configuration via user input from at least one user device associated with at least one actual data source profile of the plurality of actual data source profiles;
configuring, by the at least one processor, the at least one data split rule according to the at least one data split rule configuration; and
training, by the at least one processor, the data split prediction machine learning model based at least in part on an error between the at least one predicted data split rule and the at least one data split rule configuration.

6. The method of any of clauses 1 through 5, where the communication request includes a transaction authorization request, the communication includes a transaction, and the data content includes a transaction value.

7. The method of any of clauses 1 through 6, where the at least one data split rule includes at least one of:
a time period restriction restricting a validity of the virtual token to a particular time period, a geofenced restriction restricting the validity of the virtual token to a particular geographic area, an approved entity list identifying a set of approved entities for use of the virtual token, of an unapproved entity list identifying a set of unapproved entities for use of the virtual token.

8. The method of any of clauses 1 through 7, further including screening, by the at least one processor, the communication request based at least in part on:
   the at least one data split rule and
   the plurality of communication attributes;
   where the plurality of communication attributes further includes:
      at least one location identifier identifying a geographic location associated with the communication request, and
      a time attribute identifying a time associated with the communication request.

9. The method of any of clauses 1 through 8, further including:
   generating, by the at least one processor, a plurality of split communication requests for the plurality of actual data source profiles based at least in part on the proportion of the data content to be attributed to each actual data source profile of the plurality of actual data source profiles;
   where each split communication request of the plurality of split communication requests includes a data content split associated each actual data source profile of the plurality of actual data source profiles based on the proportion of the data content; and
   recording, by the at least one processor, each respective split communication request in a data entry history associated with a respective source profile of the plurality of actual data source profiles.

10. The method of any of clauses 1 through 9, further including determining, by the at least one processor, the at least one security score for each actual data source profile of the plurality of actual data source profiles based at least in part on each split communication request of the plurality of split communication requests.

11. The method of any of clauses 1 through 10, further including:
   receiving, by the at least one processor, a communication reversal request associated with the communication;
   where the communication reversal request includes at least one reversal attribute including:
      the virtual token,
      the entity identifier identifying the entity associated with the communication, and
      a data content reversal identifying at least a portion of the data content to be reversed;
   determining, by the at least one processor, based at least in part on the virtual token, the proportion of the data content accessed in each actual data source profile of the plurality of actual data source profiles associated with the communication;
   accessing, by the at least one processor, each actual data source profile of the plurality of actual data source profiles to reverse the access to at least a portion of the proportion of the data content of each actual data source profile of the plurality of actual data source profiles based at least in part on the data content reversal and the at least one split rule.

12. The method of any of clauses 1 through 11, further including returning, by the at least one processor, the at least the portion of the proportion of the data content of each actual data source profile of the plurality of actual data source profiles to each actual data source profile so as to reverse the access.

13. A method including:
   receiving, by at least one processor, a communication request including a virtual token that addresses the communication request to a proxy profile identifier;
   where the communication request includes:
      an entity identifier identifying an entity associated with the communication request, and
      a data content associated with communication request;
   routing, by the at least one processor, based on the virtual token, the communication request to a plurality of actual data source profiles associated with the proxy profile identifier;
   determining, by the at least one processor, based at least in part on the plurality of communication attributes, at least one split rule defining a proportion of the data content to be attributed to each actual data source profile of the plurality of actual data source profiles;
   determining, by the at least one processor, at least one security sub-score for each actual data source profile of the plurality of actual data source profiles based at least in part on the proportion of the data content attributed to each actual data source profile of the plurality of actual data source profiles;
   determining, by the at least one processor, a security score associated with the virtual token based at least in part on an aggregation of the at least one security sub-score for each actual data source profile of the plurality of actual data source profiles;
   determining, by the at least one processor, a communication request authorization based at least in part on the security score exceeding a threshold security score;
   authorizing, by the at least one processor, at least one communication associated with the communication request based at least in part on the communication request authorization.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
   receiving, by at least one processor, a communication request associated with an electronic activity being executed at an initiator device;
      wherein the communication request comprises a plurality of communication attributes associated with a communication;
      wherein the plurality of communication attributes comprises:
         virtual token,
         an entity identifier identifying an entity associated with the initiator device, and
         a data content associated with communication request;

determining, by the at least one processor, that the virtual token is a proxy profile identifier;
  wherein the proxy profile identifier identifies a plurality of actual data source profiles;
  wherein the virtual token comprises a multi-part schema that:
    defines a virtual profile for recording split activities and
    enabling the routing of the communication request via split communication requests to the plurality of actual data source profiles;
  wherein each actual data source profile of the plurality of actual data source profiles comprises an actual profile identifier different from the proxy profile identifier;
determining, by the at least one processor, based at least in part on the plurality of communication attributes, at least one split rule defining a proportion of the data content to be attributed to each actual data source profile of the plurality of actual data source profiles;
determining, by the at least one processor, at least one security risk sub-score for each actual data source profile of the plurality of actual data source profiles based at least in part on the proportion of the data content attributed to each actual data source profile of the plurality of actual data source profiles, the at least one security risk sub-score for each actual data source profile being representative of a level of risk to each actual data source associated with the communication request;
determining, by the at least one processor, a security risk score associated with the virtual token based at least in part on an aggregation of the at least one security risk sub-score for each actual data source profile of the plurality of actual data source profiles;
determining, by the at least one processor, a communication request authorization based at least in part on the security risk score satisfying a threshold security score;
accessing, by the at least one processor, based on the communication request authorization, each actual data source profile of the plurality of actual data source profiles to access the proportion of the data content of each actual data source profile of the plurality of actual data source profiles;
consolidating, by the at least one processor, the proportion of the data content accessed from each actual data source profile of the plurality of actual data source profiles into a single response; and
executing, by the at least one processor, the electronic activity with the single response.

2. The method of claim 1, further comprising:
utilizing, by the at least one processor, a data split prediction machine learning model to predict at least one predicted split rule based at least in part on:
each actual data source profile of the plurality of actual data source profiles, and
a data entry history associated with each actual data source profile of the plurality of actual data source profiles.

3. The method of claim 2, further comprising:
configuring, by the at least one processor, the at least one data split rule according to the at least one predicted data split rule.

4. The method of claim 2, further comprising:
receiving, by the at least one processor, at least one data split rule configuration via user input from at least one user device associated with at least one actual data source profile of the plurality of actual data source profiles;
configuring, by the at least one processor, the at least one data split rule according to the at least one data split rule configuration; and
training, by the at least one processor, the data split prediction machine learning model based at least in part on an error between the at least one predicted data split rule and the at least one data split rule configuration.

5. The method of claim 1, wherein the communication request comprises a transaction authorization request, the communication comprises a transaction and the data content comprises a transaction value.

6. The method of claim 1, wherein the at least one data split rule comprises at least one of:
a time period restriction restricting a validity of the virtual token to a particular time period,
a geofenced restriction restricting the validity of the virtual token to a particular geographic area,
an approved entity list identifying a set of approved entities for use of the virtual token, of an unapproved entity list identifying a set of unapproved entities for use of the virtual token.

7. The method of claim 6, further comprising screening, by the at least one processor, the communication request based at least in part on:
the at least one data split rule and
the plurality of communication attributes;
wherein the plurality of communication attributes further comprises:
at least one location identifier identifying a geographic location associated with the communication request, and
a time attribute identifying a time associated with the communication request.

8. The method of claim 1, further comprising:
generating, by the at least one processor, a plurality of split communication requests for the plurality of actual data source profiles based at least in part on the proportion of the data content to be attributed to each actual data source profile of the plurality of actual data source profiles;
wherein each split communication request of the plurality of split communication requests comprises a data content split associated each actual data source profile of the plurality of actual data source profiles based on the proportion of the data content; and
recording, by the at least one processor, each respective split communication request in a data entry history associated with a respective source profile of the plurality of actual data source profiles.

9. The method of claim 8, further comprising determining, by the at least one processor, the at least one security score for each actual data source profile of the plurality of actual data source profiles based at least in part on each split communication request of the plurality of split communication requests.

10. The method of claim 1, further comprising:
receiving, by the at least one processor, a communication reversal request associated with the communication;
wherein the communication reversal request comprises at least one reversal attribute comprising:
the virtual token,
the entity identifier identifying the entity associated with the communication, and a data content reversal identifying at least a portion of the data content to be reversed;

determining, by the at least one processor, based at least in part on the virtual token, the proportion of the data content accessed in each actual data source profile of the plurality of actual data source profiles associated with the communication;

accessing, by the at least one processor, each actual data source profile of the plurality of actual data source profiles to reverse the access to at least a portion of the proportion of the data content of each actual data source profile of the plurality of actual data source profiles based at least in part on the data content reversal and the at least one split rule.

11. The method of claim 10, further comprising returning, by the at least one processor, the at least the portion of the proportion of the data content of each actual data source profile of the plurality of actual data source profiles to each actual data source profile so as to reverse the access.

12. A system comprising:
at least one processor configured to perform steps to:
receive a communication request associated with an electronic activity being executed at an initiator device;
wherein the communication request comprises a plurality of communication attributes associated with a communication;
wherein the plurality of communication attributes comprises:
virtual token,
an entity identifier identifying an entity associated with the initiator device, and
a data content associated with communication request;
determine that the virtual token is a proxy profile identifier;
wherein the proxy profile identifier identifies a plurality of actual data source profiles;
wherein the virtual token comprises a multi-part schema that:
defines a virtual profile for recording split activities and
enabling the routing of the communication request via split communication requests to the plurality of actual data source profiles;
wherein each actual data source profile of the plurality of actual data source profiles comprises an actual profile identifier different from the proxy profile identifier;
determine based at least in part on the plurality of communication attributes, at least one split rule defining a proportion of the data content to be attributed to each actual data source profile of the plurality of actual data source profiles;
determine at least one security risk sub-score for each actual data source profile of the plurality of actual data source profiles based at least in part on the proportion of the data content attributed to each actual data source profile of the plurality of actual data source profiles, the at least one security risk sub-score for each actual data source profile being representative of a level of risk to each actual data source associated with the communication request;
determine a security risk score associated with the virtual token based at least in part on an aggregation of the at least one security risk sub-score for each actual data source profile of the plurality of actual data source profiles;

determine a communication request authorization based at least in part on the security risk score satisfying a threshold security score;

access, based on the communication request authorization, each actual data source profile of the plurality of actual data source profiles to access the proportion of the data content of each actual data source profile of the plurality of actual data source profiles;

consolidate the proportion of the data content accessed from each actual data source profile of the plurality of actual data source profiles into a single response; and execute the electronic activity with the single response.

13. The system of claim 12, wherein the at least one processor is further configured to perform steps to:
utilize a data split prediction machine learning model to predict at least one predicted split rule based at least in part on:
each actual data source profile of the plurality of actual data source profiles, and
a data entry history associated with each actual data source profile of the plurality of actual data source profiles.

14. The system of claim 13, wherein the at least one processor is further configured to perform steps to:
configure the at least one data split rule according to the at least one predicted data split rule.

15. The system of claim 13, wherein the at least one processor is further configured to perform steps to:
receive at least one data split rule configuration via user input from at least one user device associated with at least one actual data source profile of the plurality of actual data source profiles;
configure the at least one data split rule according to the at least one data split rule configuration; and
train the data split prediction machine learning model based at least in part on an error between the at least one predicted data split rule and the at least one data split rule configuration.

16. The system of claim 12, wherein the communication request comprises a transaction authorization request, the communication comprises a transaction and the data content comprises a transaction value.

17. The system of claim 12, wherein the at least one data split rule comprises at least one of:
a time period restriction restricting a validity of the virtual token to a particular time period,
a geofenced restriction restricting the validity of the virtual token to a particular geographic area,
an approved entity list identifying a set of approved entities for use of the virtual token, of an unapproved entity list identifying a set of unapproved entities for use of the virtual token.

18. The system of claim 17, wherein the at least one processor is further configured to perform steps to screen the communication request based at least in part on:
the at least one data split rule and
the plurality of communication attributes;
wherein the plurality of communication attributes further comprises:
at least one location identifier identifying a geographic location associated with the communication request, and a time attribute identifying a time associated with the communication request.

19. The system of claim 12, wherein the at least one processor is further configured to perform steps to:
generate a plurality of split communication requests for the plurality of actual data source profiles based at least in part on the proportion of the data content to be attributed to each actual data source profile of the plurality of actual data source profiles;
wherein each split communication request of the plurality of split communication requests comprises a data content split associated each actual data source profile of the plurality of actual data source profiles based on the proportion of the data content; and
record each respective split communication request in a data entry history associated with a respective source profile of the plurality of actual data source profiles.

20. A method comprising:
receiving, by at least one processor, a communication request comprising a virtual token that addresses the communication request to a proxy profile identifier;
wherein the communication request comprises:
an entity identifier identifying an entity associated with the communication request, and
a data content associated with communication request;
wherein the virtual token comprises a multi-part schema that:
defines a virtual profile for recording split activities and
enabling the routing of the communication request via split communication requests to the plurality of actual data source profiles;
routing, by the at least one processor, based on the virtual token, the communication request to a plurality of actual data source profiles associated with the proxy profile identifier;
determining, by the at least one processor, at least one split rule defining a proportion of the data content to be attributed to each actual data source profile of the plurality of actual data source profiles;
determining, by the at least one processor, at least one security risk sub-score for each actual data source profile of the plurality of actual data source profiles based at least in part on the proportion of the data content attributed to each actual data source profile of the plurality of actual data source profiles, the at least one security risk sub-score for each actual data source profile being representative of a level of risk to each actual data source associated with the communication request;
determining, by the at least one processor, a security risk score associated with the virtual token based at least in part on an aggregation of the at least one security risk sub-score for each actual data source profile of the plurality of actual data source profiles;
determining, by the at least one processor, a communication request authorization based at least in part on the security risk score satisfying a threshold security score;
authorizing, by the at least one processor, at least one communication associated with the communication request based at least in part on the communication request authorization.

* * * * *